United States Patent [19]
Ishikawa et al.

[11] Patent Number: 6,008,755
[45] Date of Patent: Dec. 28, 1999

[54] ANTENNA-SHARED DISTRIBUTOR AND TRANSMISSION AND RECEIVING APPARATUS USING SAME

[75] Inventors: Yohei Ishikawa; Toru Tanizaki, both of Kyoto; Hiroshi Nishida, Kawanishi; Atsushi Saitoh, Nagaokakyo, all of Japan

[73] Assignee: Murata Manufacturing Co., Ltd., Japan

[21] Appl. No.: 08/956,212

[22] Filed: Oct. 22, 1997

[30] Foreign Application Priority Data

Oct. 23, 1996 [JP] Japan .................................. 8-280681

[51] Int. Cl.$^6$ ........................................................ G01S 7/28
[52] U.S. Cl. .......................... 342/175; 342/70; 333/137; 333/208; 333/219.1; 333/248; 343/785
[58] Field of Search ............................... 342/175, 70, 71, 342/72; 333/125, 126, 129, 134, 135, 137, 202, 208, 219.1, 248; 343/778, 785, 753; 331/77; 332/130, 135

[56] References Cited

U.S. PATENT DOCUMENTS

| | | | |
|---|---|---|---|
| 4,731,611 | 3/1988 | Muller et al. | 342/28 |
| 4,789,844 | 12/1988 | Schloemann | 333/1.1 |
| 5,497,163 | 3/1996 | Lohninger et al. | 342/175 |
| 5,686,873 | 11/1997 | Tada et al. | 333/134 |

FOREIGN PATENT DOCUMENTS

| | | |
|---|---|---|
| 0700114 | 3/1996 | European Pat. Off. . |
| 0709912 | 5/1996 | European Pat. Off. . |
| 0743697 | 11/1996 | European Pat. Off. . |

OTHER PUBLICATIONS

Hamaba Tsuyoshi; "NRD Guide Circuit and its Production"; Apr. 7, 1995; Publication No. 07094915 (Patent Abstracts of Japan).

Shiba Satoshi; "Slot Antenna with Dielectric Resonator"; May 19, 1995; Publication No. 07131235 (Patent Abstracts of Japan).

*Primary Examiner*—John B. Sotomayor
*Attorney, Agent, or Firm*—Ostrolenk, Faber, Gerb & Soffen, LLP

[57] ABSTRACT

An antenna-shared distributor is provided such that a nonconductor section is provided in a part of two conductor planes, a dielectric resonator which resonates in the HE111 mode is disposed between the conductor planes, and first and second dielectric strips whose respective end portions face the dielectric resonator are disposed, forming first and second dielectric lines and further, a voltage-controlled oscillator and a mixer are connected to the first and second dielectric lines, respectively.

24 Claims, 10 Drawing Sheets

ANTENNA-SHARED DISTRIBUTOR AND TRANSMISSION AND RECEIVING APPARATUS USING SAME

BACKGROUND OF THE INVENTION

1. Field of the Invention

The present invention relates to an antenna-shared distributor and, more particularly, to an antenna-shared distributor for a dielectric line for use in a millimeter-wave radar or the like to be mounted in a vehicle and a transmission and receiving apparatus using such distributor.

2. Description of the Related Art

Millimeter-wave radars to be mounted in a vehicle are used to measure a relative velocity between a subject vehicle and another vehicle and the distance between the subject vehicle and the other vehicle. Transmission and receiving apparatus of such millimeter-wave radars are generally modules including a millimeter-wave voltage controlled oscillator, a circulator, a coupler, a mixer, an antenna and the like, and this module is mounted in the front or the back of a vehicle and used.

Figure 11:
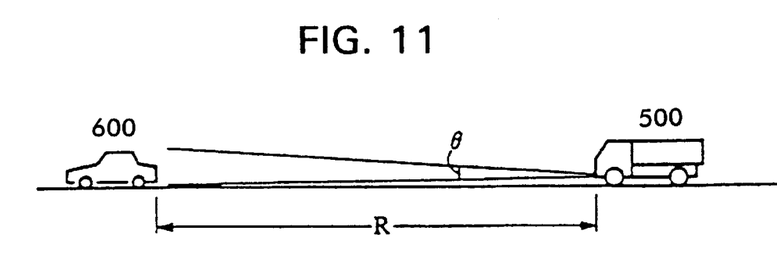
FIG. 11 shows the usage of a millimeter-wave radar to be mounted in a vehicle, and the relationship between the beam width of a transmission wave and a detection distance.
Figure 12:
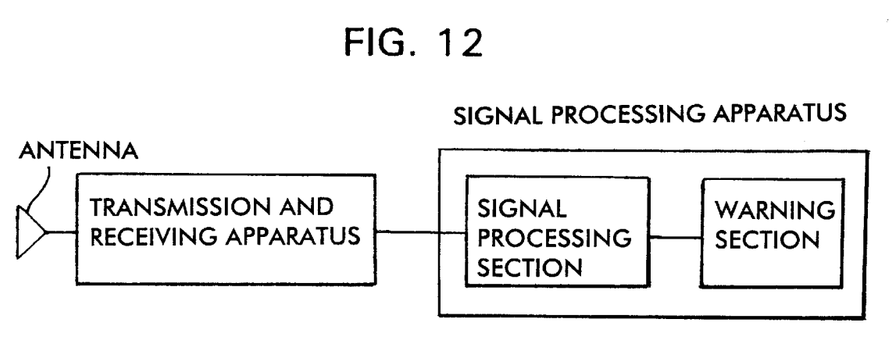
FIG. 12 is a block diagram illustrating the construction of the millimeter-wave radar to be mounted in a vehicle.

In FIG. 11, the relative distance and the relative velocity between a truck 500 and an automobile 600 driving in front is measured by transmitting and receiving a millimetric wave from the truck 500 by an FM-CW method. FIG. 12 is a block diagram of a millimeter-wave radar used herein. The transmission and receiving apparatus and the antenna are mounted to the front of the vehicle. A signal processing section limits a transmission and receiving apparatus in order to cause it to transmit a millimetric wave by a predetermined method, and analyzes radio waves received by the antenna in order to compute, for example, the distance between two vehicles. When the distance between the two vehicles reaches below a predetermined distance, the signal processing section controls a warning section in order to call a driver to attention.

Figure 13:
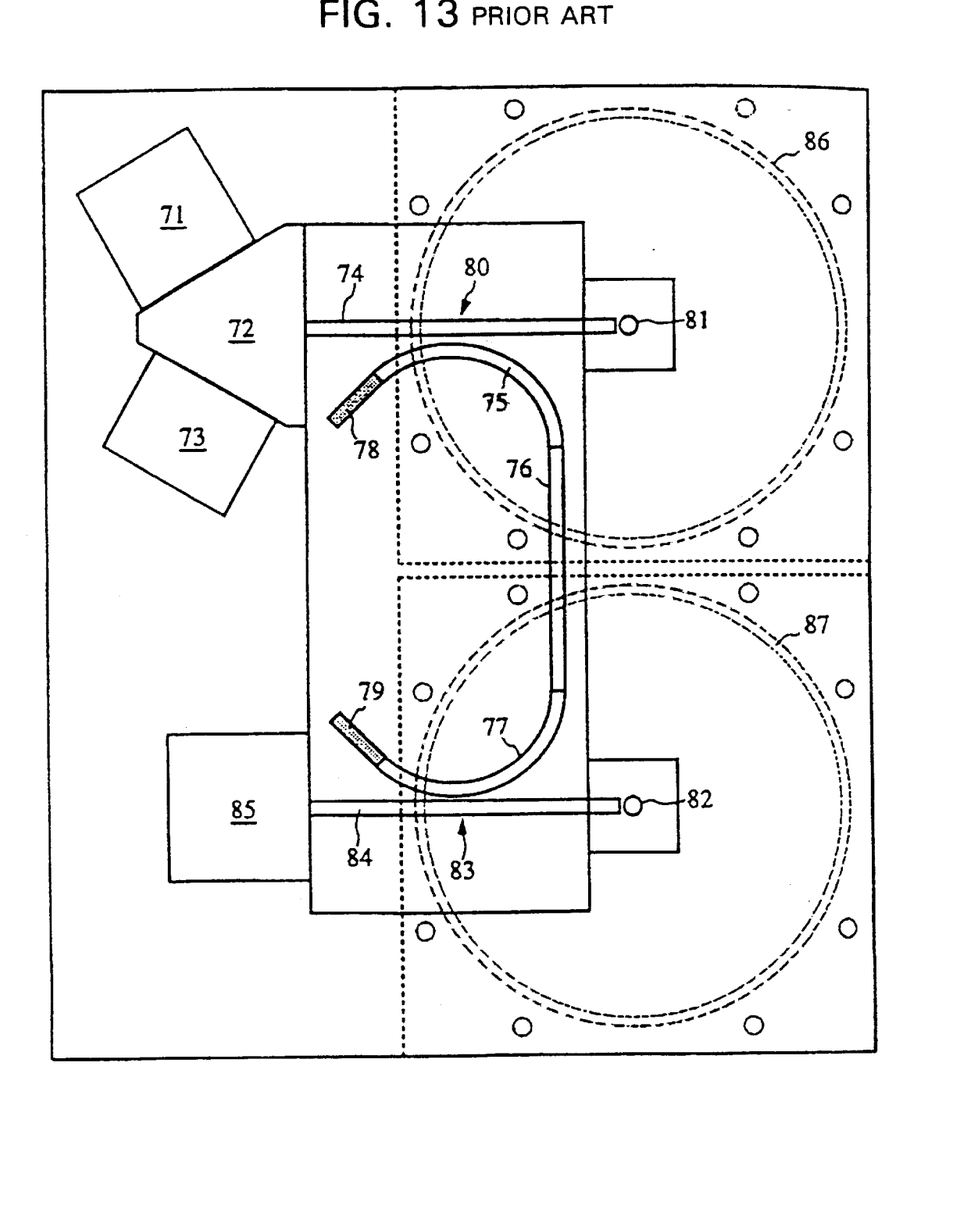
FIG. 13 is a schematic plan view illustrating the construction of a transmission and receiving apparatus of the prior art.

FIG. 13 shows the construction of a transmission and receiving apparatus of the prior art, and is a schematic plan view illustrating a state in which a conductor plate which covers the top portion of a dielectric strip which will be described later is removed. In FIG. 13, reference numeral 72 denotes a circulator, with a voltage controlled oscillator 71 and a terminater 73 being disposed on two sides of the circulator 72. Reference numeral 81 denotes a dielectric resonator for transmission of a primary radiator, with a dielectric strip 74 being disposed between the circulator 72 and the dielectric resonator 81. Reference numeral 82 denotes a dielectric resonator for reception of a primary radiator, and reference numeral 85 denotes a mixer, with a dielectric strip 84 being disposed between the dielectric resonator 82 and the mixer 85. Further, a linear-shaped dielectric strip 76, dielectric strips 75 and 77 which each constitute a bent portion, and terminators 78 and 79 are disposed. A portion proximate to the dielectric strips 74 and 75 is structured as a coupler 80, and a portion proximate to the dielectric strips 84 and 77 is structured as a coupler 83. Further, dielectric lenses 86 and 87 are mounted in the upper portion of the dielectric resonators 81 and 82, respectively.

Figure 14:
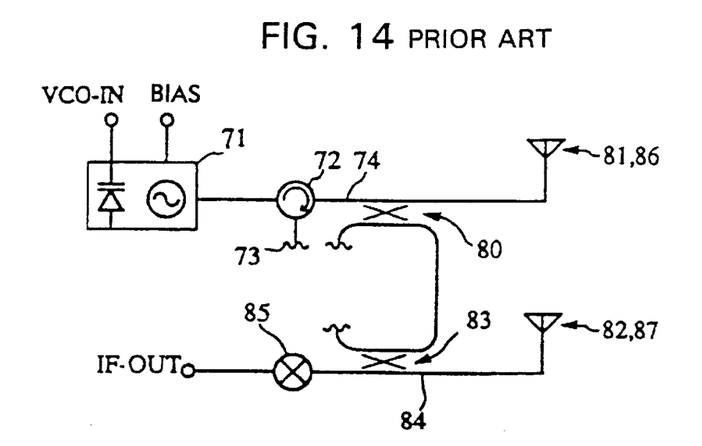
FIG. 14 is an equivalent circuit diagram of the transmission and receiving apparatus shown in FIG. 13.

FIG. 14 is an equivalent circuit diagram of the transmission and receiving apparatus shown in FIG. 13. The voltage-controlled oscillator 71 includes a varactor diode and a Gunn diode. An oscillation signal therefrom is propagated to the dielectric resonator 81 through the circulator 72 and radiated to the outside through a window formed in the conductor plate in the upper portion of the dielectric resonator 81 and the dielectric lens 86. The circulator 72 and the terminater 73 constitute an isolator. An RF signal received via the dielectric lens 87 and the dielectric resonator 82 is propagated through the dielectric strip 84. At this time, a Lo signal (local oscillator signal) is introduced to the dielectric strip 84 by the couplers 80 and 83 and input to the mixer 85. The mixer 85 is formed of a Schottky barrier diode and generates an IF signal (intermediate frequency signal).

However, in a transmission and receiving apparatus for a millimeter-wave radar, a curved line (bent portion) must be provided in a dielectric strip, and couplers comprising two dielectric strips which are brought close to each other must be provided at at least two places within the apparatus in order to supply a part of a transmission signal as a Lo signal (local oscillator signal) to the mixer. A large area is required to construct such a coupler. In particular, when a dielectric line is formed using a nonradiative dielectric line (NRD guide), the orthogonality between the LSM01 mode and the LSE01 mode is distorted in the curved portion, and coupling occurs between the modes. Therefore, a low-loss characteristic of the line is realized only at the radius of curvature and the curved corner in a narrow range of the line. Thus, the shape of the coupler is limited, and formation of the apparatus into a small size is difficult.

Meanwhile, the aperture diameter of the antenna depends on the specifications of the transmission and receiving apparatus. When, for example, a transmission wave is within a spread of 3.5 m after 100 m in the forward direction, the beam angle is 2°, and the antenna aperture diameter must be approximately 170 mm in the 60 GHz band. Further, when a transmission wave is within a spread of 3.5 m after 50 m in the forward direction, the beam width angle is 4°. For this reason, the antenna aperture diameter must be approximately 90 mm. In the transmission and receiving apparatus of FIG. 13, since the area where the coupler is formed together with the voltage-control oscillator and the mixer becomes larger than the antenna size, the transmission and receiving apparatus is forced to be enlarged as a whole.

Further, for the purpose of achieving a small size of the apparatus, shared use of a single antenna in transmission and reception is possible. However, in this case, a circulator for distributing a transmission signal and a receiving signal becomes necessary, and therefore a large reduction in size cannot be realized.

SUMMARY OF THE INVENTION

It is an object of the present invention to provide a compact antenna-shared distributor and a transmission and receiving apparatus using such distributor.

To this end, according to one aspect of the present invention, there is provided an antenna-shared distributor, comprising: two facing conductor sections; and a dielectric resonator disposed between the conductor sections. A non-conductor section is provided in at least one of the conductor sections and at a position facing the dielectric resonator. Further, a first dielectric line and a second first dielectric line are disposed adjacent the dielectric resonator.

Since this antenna-shared distributor is formed of only a resonator and at least two dielectric lines facing each other with the resonator interposed in between, the antenna-shared distributor has a simple construction.

According to another aspect of the present invention, there is provided a transmission and receiving apparatus comprising an oscillator coupled to one of the dielectric lines disposed with the antenna-shared distributor interposed therebetween, and a mixer circuit coupled to the other dielectric line.

In this transmission and receiving apparatus, since one antenna-shared distributor is only disposed between the oscillation circuit and the mixer circuit, the construction of the transmission and receiving apparatus is simple.

The transmission and receiving apparatus may further include an electromagnetic guide in the shape of a horn which is disposed around the non-conductor section. The horn makes it possible to efficiently focus radio waves onto the dielectric resonator.

The transmission and receiving apparatus may further include a dielectric lens at a position facing the non-conductor section. The dielectric lens makes it possible to increase the focus of radio waves radiated from the dielectric resonator.

Other features and advantages of the present invention will become apparent from the following description of the invention which refers to the accompanying drawings.

BRIEF DESCRIPTION OF THE DRAWINGS

FIGS. 10A1, 10A2, 10B1 and 10B2 are sectional views illustrating the construction of another dielectric line used in a transmission and receiving apparatus according to the present invention;

DETAILED DESCRIPTION OF EMBODIMENTS OF THE INVENTION

The construction of an antenna-shared distributor for a dielectric line and a transmission and receiving apparatus using such an antenna-shared distributor according to a first embodiment of the present invention will be described below with reference to FIGS. 1A, 1B to 5.

Figure 1A:
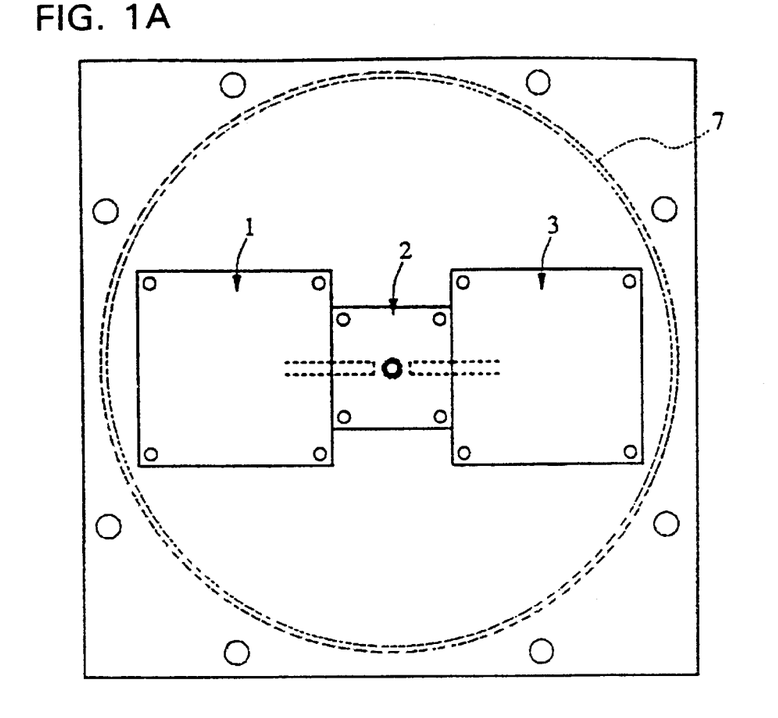
FIGS. 1A and 1B show the construction of an antenna-shared distributor and a transmission and receiving apparatus using such an antenna-shared distributor according to a first embodiment of the present invention.
Figure 1B:
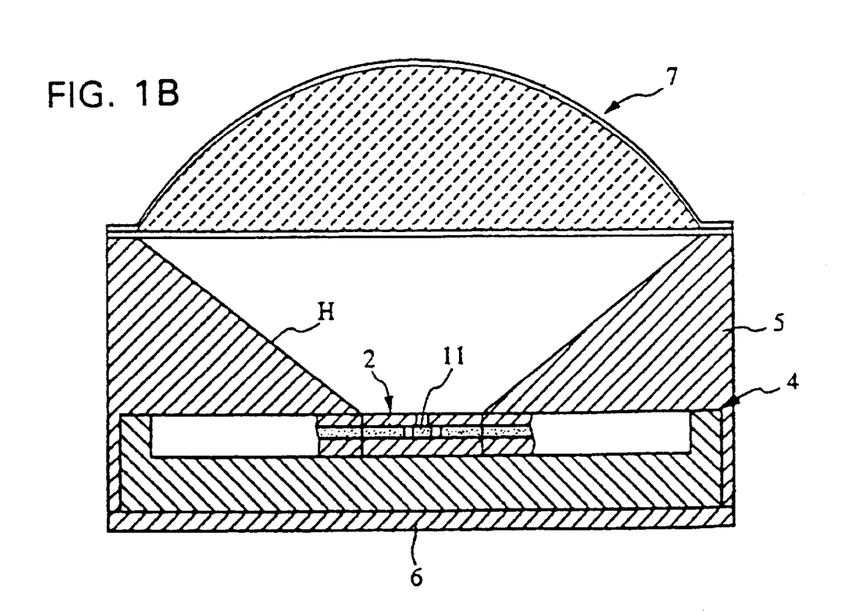

A circuit unit 4 of FIGS. 1A and 1B includes a voltage-controlled oscillator 1, an antenna-shared distributor 2, and a mixer 3. The antenna-shared distributor 2 is disposed in the center of the unit, and the voltage-controlled oscillator 1 and the mixer 3 are disposed on both sides of the antenna-shared distributor 2. The circuit unit 4, as shown in FIG. 1B, is mounted to the lower portion of a case 5 and is covered with a rear lid 6. Further, a dielectric lens 7 is mounted above the case 5. This dielectric lens 7 is made of a composite material, for example, a resin and ceramic, with the relative dielectric constant thereof being set at approximately 4.0. Further, a matching layer having a relative dielectric constant of approximately 2.0 for preventing reflection is provided on the top surface and the bottom surface of the dielectric lens 7. A dielectric resonator 11, serving as a primary vertical radiator, is provided at the focus position of the dielectric lens 7 in the center of the antenna-shared distributor 2.

Figure 2A:
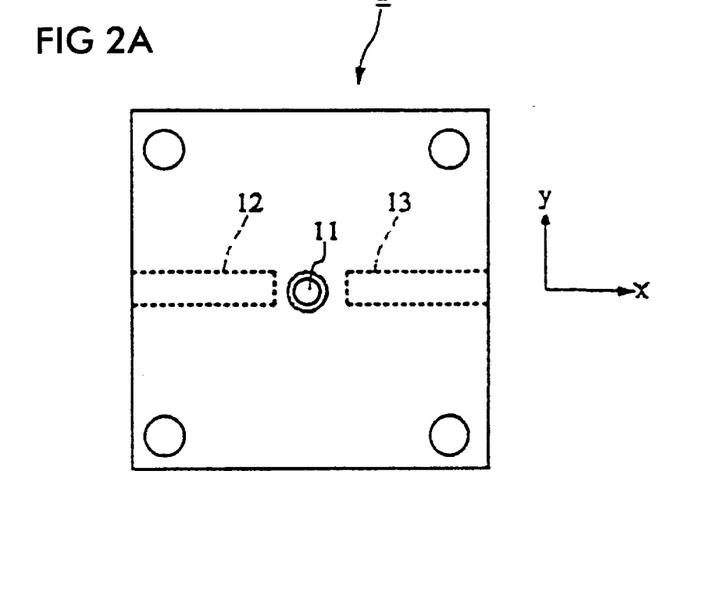
FIGS. 2A, 2B and 2C show the construction of the antenna-shared distributor.
Figure 2B:
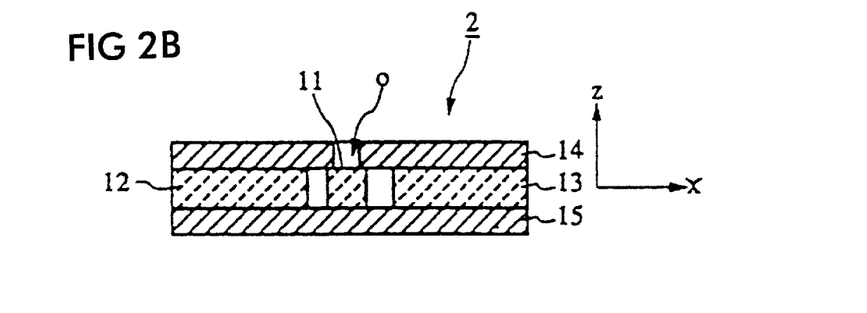
Figure 2C:
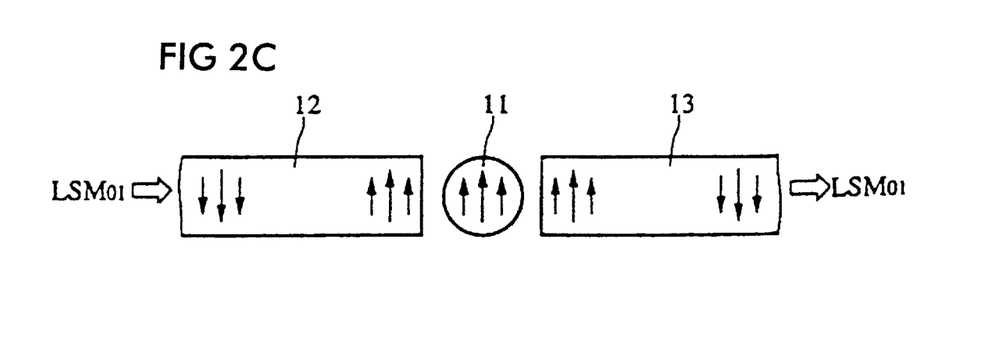

FIGS. 2A and 2B are a top plan view and a sectional view of the antenna-shared distributor 2, respectively. An opening o is provided in the center of a conductor plate 14. The conductor plate 14 may be such that the surface of the conductor plate is coated with a conductor; in this case, in place of the opening o, a portion having the coating of the conductor removed may be provided. The dielectric resonator 11, which resonates in the HE111 mode, is disposed below the opening o in such a manner that the axis of the dielectric resonator 11 is normal to the main surface of the conductor plate 14 and a conductor plate 15. Further, a first dielectric strip 12 and a second dielectric strip 13 are disposed between the conductor plates 14 and 15 such that the respective end portions of the dielectric strips 12 and 13 face the dielectric resonator 11. The electromagnetic wave of the LSM mode in which an electric field having components at right angles to the direction of the length (in the x-axis direction in the figure) of the dielectric strip 12 and parallel (in the y-axis direction in the figure) to the conductor plates 14 and 15 and a magnetic field having components normal to the conductor plates 14 and 15 occur propagates within the dielectric strip 12. Since the dielectric resonator 11 resonates in the HE111 mode having electric-field components in the same direction as that of the electric field of the dielectric strip 12, the first dielectric strip 12 and the dielectric resonator 11 are easily coupled to each other. Then, a linearly polarized electromagnetic wave is radiated in a direction normal (in the z-axis direction in the figure) to the conductor plate 14 via the opening o. Further, the dielectric line 13 formed of a dielectric strip and the dielectric resonator 11 are coupled to each other, and the electromagnetic wave propagates within the dielectric line 13 in the LSM mode, as shown in FIG. 2C. This signal is a Lo signal to be sent to the mixer 3 shown in FIG. 1A. When a signal reflected from a target object enters the dielectric resonator 11, an LSM01-mode signal propagates within the dielectric line 13 as a result of the coupling between the dielectric line 13 and the dielectric resonator 11. This signal is supplied as an RF signal to the mixer 3. The power distribution ratio of the radiation power of the transmission signal to the Lo signal may be set according to the spacing between the dielectric resonator 11 and the dielectric strips 12 and 13.

Figure 3:
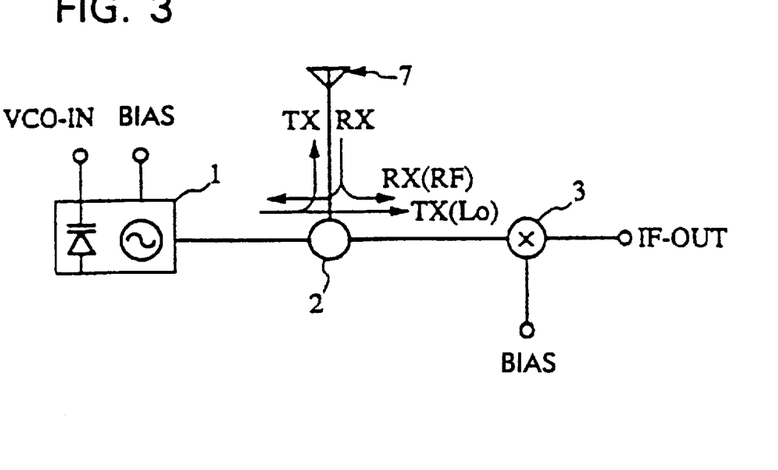
FIG. 3 is an equivalent circuit diagram of the transmission and receiving apparatus shown in FIGS. 1A and 1B.

FIG. 3 is an equivalent circuit diagram of the transmission and receiving apparatus shown in FIGS. 1A and 1B. The voltage-controlled oscillator 1 includes a varactor diode and a Gunn diode. An oscillation signal Tx from the voltage-controlled oscillator 1 is distributed by the antenna-shared distributor 2 and is radiated from an antenna formed of the dielectric resonator and the dielectric lens 7 within the antenna-shared distributor. A part of the oscillation signal Tx comprises a Lo signal and is provided to the mixer 3. A received signal RX is also distributed by the antenna-shared distributor 2, and one of the signals is supplied as an RF signal to the mixer 3. As a result, the mixer 3 outputs an IF signal.

Figure 4A:
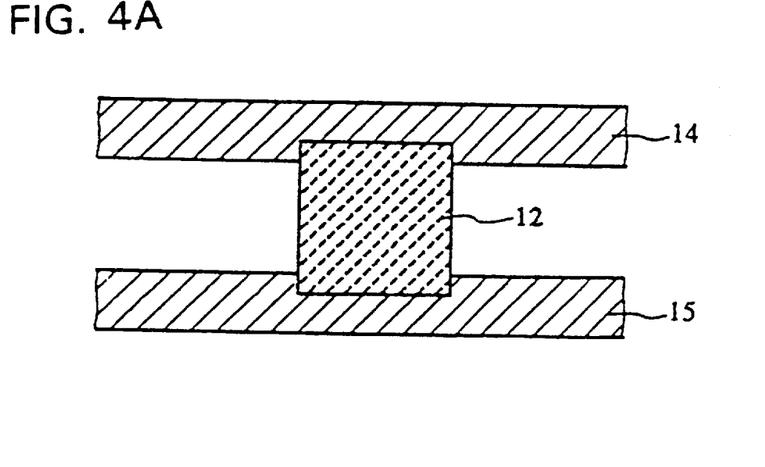
FIGS. 4A and 4B are sectional views illustrating the construction of a dielectric line of each section used in the first embodiment of the present invention.
Figure 4B:
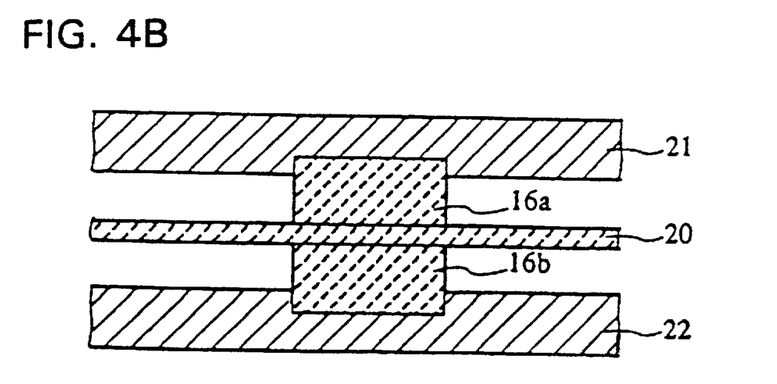

FIG. 4A is a sectional view of a dielectric line within the antenna-shared distributor, in which the dielectric strip 12 is fitted into the grooves formed in the conductor plates 14 and 15. FIG. 4B is a sectional view of a dielectric line within the voltage-controlled oscillator 1, in which similarly dielectric strips 16a and 16b are fitted into the grooves on the surface of the conductor plates 21 and 22, and a substrate 20 is disposed between the dielectric strips 16a and 16b. The cross section of the dielectric line within the mixer 3 is similar to that shown in FIG. 4B. By determining the spacing between the two conductor plates, the depth of the groove, and the thickness and the relative dielectric constant of the dielectric strip, an NRD guide can be constructed with the dielectric strip portion made as a propagation area and the other area made as a non-propagation area (cut-off area).

Figure 5A:
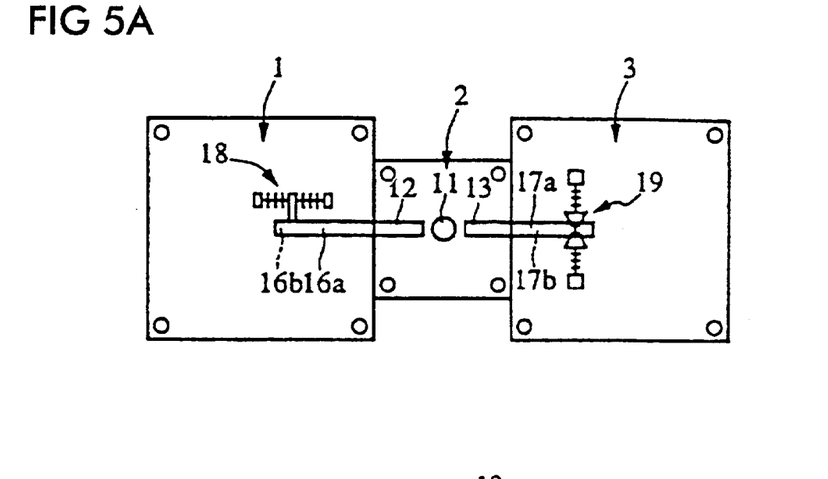
FIGS. 5A, 5B and 5C show the construction of a voltage-controlled oscillator and a mixer.
Figure 5B:
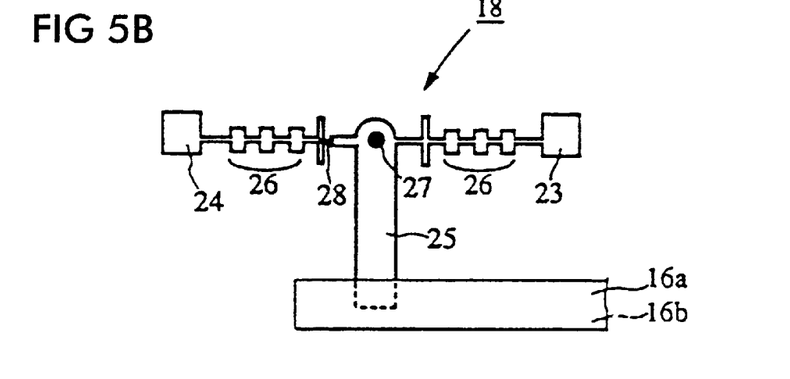
Figure 5C:
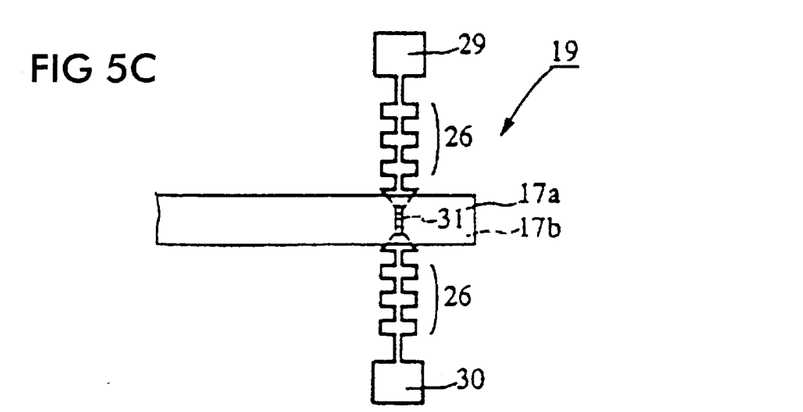

FIGS. 5A, 5B and 5C show the construction of the interior of the voltage-controlled oscillator 1 and the mixer 3. As shown in FIG. 5A, inside the voltage-controlled oscillator 1, the dielectric strips 16a and 16b which connect to the dielectric strip 12 of the antenna-shared distributor 2 are provided, and an oscillation circuit 18 is provided on the substrate interposed between these two dielectric strips 16a and 16b. Further, inside the mixer 3, dielectric strips 17a and 17b which connect to the dielectric strip 13 of the antenna-shared distributor 2 are provided, and a mixer circuit 19 is formed on the substrate interposed between these two dielectric strips 17a and 17b.

FIG. 5B is an enlarged view of the oscillation circuit 18. A suspended line 25 extends in a direction normal to the dielectric strips 16a and 16b, and a conductor pattern 26 for RF choke and further electrodes 23 and 24 are connected to the end of the suspended line 25. One pole of a Gunn diode 27 is connected to the suspended line 25. A varactor diode 28 is connected between the conductor pattern 26 for RF choke and the suspended line 25. The other pole of the Gunn diode 27 is grounded, and the application of a bias voltage to the Gunn diode between the electrode 23 and the ground causes the Gunn diode to oscillate. Since the conductor pattern 26 for RF choke can be assumed to be grounded in a high frequency region, the varactor diode 28 is connected equivalently in parallel to the Gunn diode 27. A modulation signal applied between the electrodes 23 and 24 causes the electrostatic capacity of the varactor diode to change, causing the oscillation frequency of the Gunn diode to be modulated.

FIG. 5C is an enlarged view of the mixer circuit 19. The conductor patterns 26 for RF choke extend in a direction normal to the dielectric strips 17a and 17b, and electrodes 29 and 30 are formed in the end portions of the conductor patterns 26. A nonlinear element for example the Schottky barrier diode 31 is mounted in that portion between the end portions of the two conductor patterns for RF choke which is interposed between the dielectric strips 17a and 17b. The Schottky barrier diode 31 is coupled to an RF signal and a Lo signal which are propagated through the dielectric strips 17a and 17b and generates an IF signal when a bias voltage is applied between the electrodes 29 and 30.

Figure 6A:
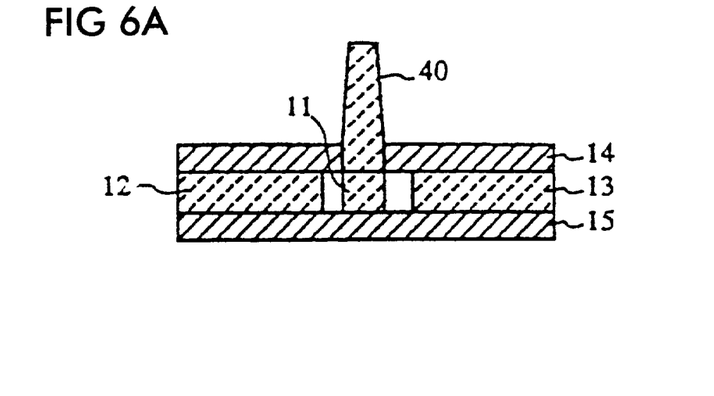
FIGS. 6A, 6B and 6C show the construction of an antenna-shared distributor according to a second embodiment of the present invention.
Figure 6B:
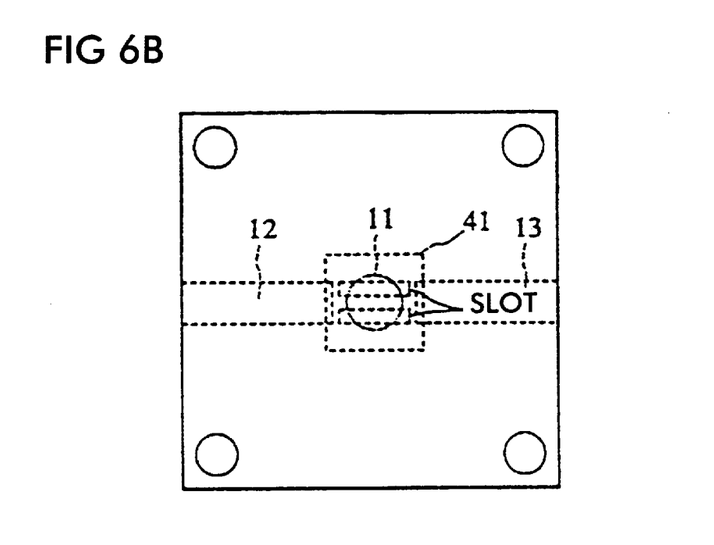
Figure 6C:
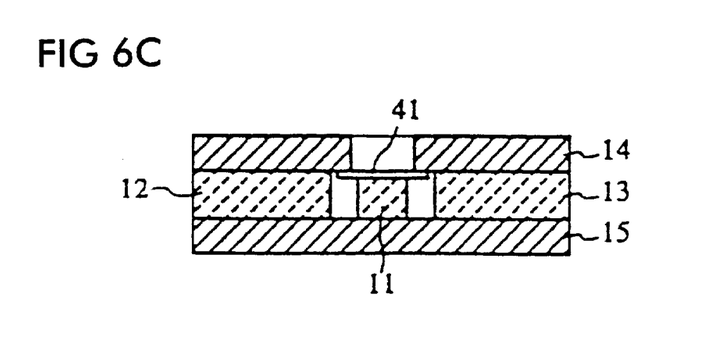

FIGS. 6A, 6B and 6C show two other construction examples of the antenna-shared distributor. A dielectric rod 40 which goes through the conductor plate 14 and connects to the dielectric resonator 11, such as that shown in FIG. 6A, may be provided. This dielectric rod 40 functions as a dielectric rod antenna, making it possible to increase the directivity of the antenna. Further, as shown in FIGS. 6B and 6C, a plate 41 having a slot may be disposed between the dielectric resonator 11 and the conductor plate 14. The plate 41 may be such that an opening of any desired pattern is formed within a metallic plate or any desired pattern is formed by removing a part of a conductor plate on the circuit substrate. Varying the slot arrangement pattern makes it possible to control the directivity of radio waves from the antenna.

Figure 7A:
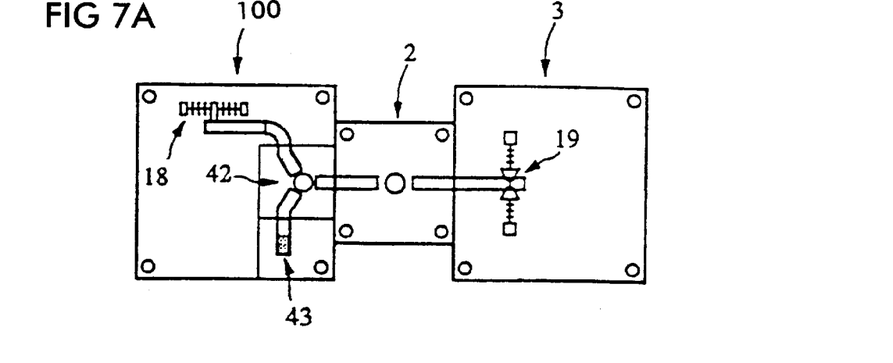
FIGS. 7A and 7B show the construction of a circuit unit of a transmission and receiving apparatus according to a second embodiment of the present invention.

FIG. 7A shows the internal construction of a transmission and receiving apparatus according to a second embodiment of the present invention. An oscillation signal from an oscillation circuit 38 is supplied to the antenna-shared distributor 2 via an isolator 1circulator 42. A signal from the antenna-shared distributor 2 to the voltage-controlled oscillator 100 is supplied to a terminator 43 via the circulator 42.

Figure 7B:
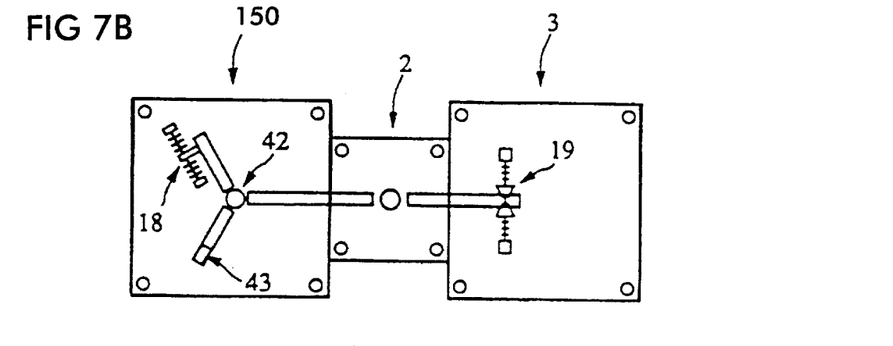

In the apparatus of FIG. 7A, the circulator 42 and the voltage-control oscillator 100 are different modules. Of course, as shown in FIG. 7B, the isolator 42', a terminator 43', and an oscillation circuit 38' may be housed inside a voltage-controlled oscillator 150.

Figure 8:
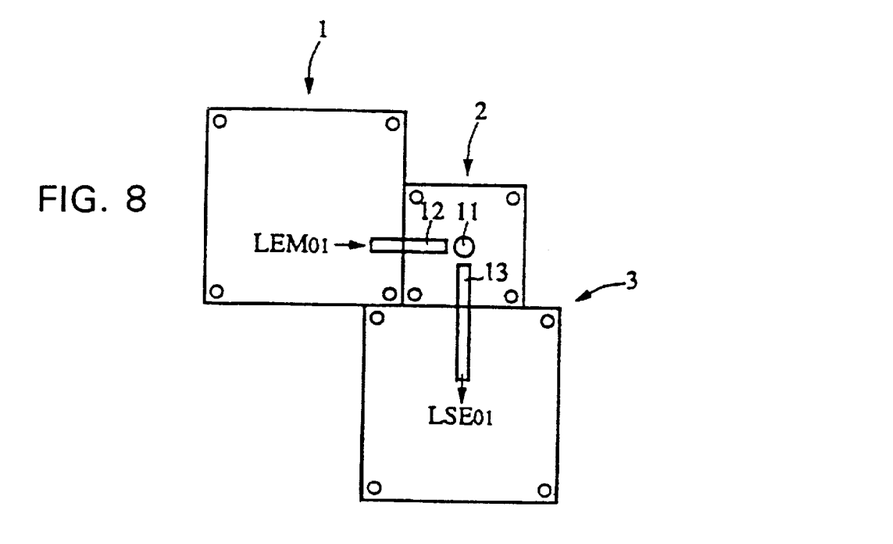
FIG. 8 shows the construction of a circuit unit of a transmission and receiving apparatus according to a third embodiment of the present invention.

FIG. 8 shows the interior construction of a transmission and receiving apparatus according to a third embodiment of the present invention. The dielectric strips 12 and 13 are made to intersect at right angles to each other. When a transmission signal of the LSM01 mode is supplied from the voltage-controlled oscillator 1 via the dielectric strip 12 to the antenna-shared distributor 2, the dielectric resonator 11 excites in the HE111 mode and radiates a linearly polarized electromagnetic wave in the forward direction of FIG. 8, and at the same time radiates a signal of the LSE01 mode to the dielectric strip 13. This LSE01-mode signal is provided as a Lo signal to the mixer 3. A reflection signal from the target object is made to enter the dielectric resonator 11 and an RF signal therefrom is supplied to the mixer 3 in the LSE01 mode. The power distribution ratio of the radiation power of the transmission signal to the Lo signal may be set according to the spacing between the dielectric resonator 11 and the dielectric strips 12 and 13.

Figure 9A:
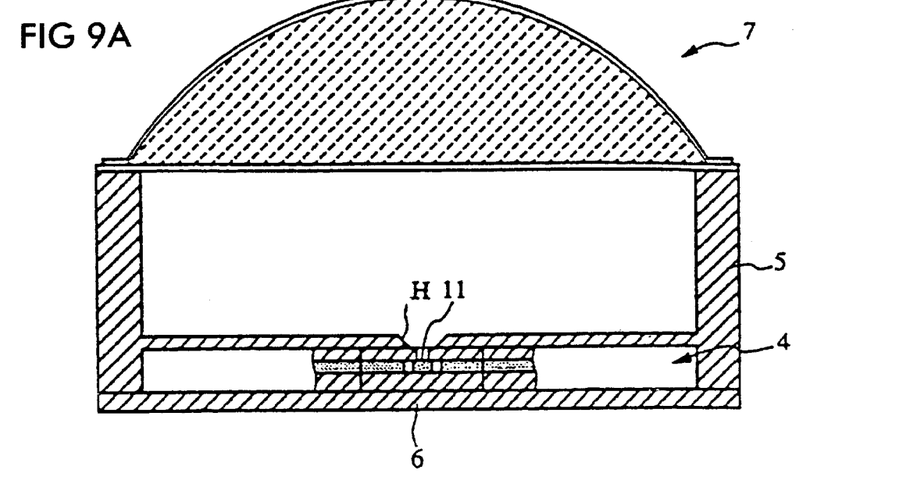
FIGS. 9A, 9B and 9C are sectional views of a transmission and receiving apparatus according to fourth, fifth and sixth embodiments of the present invention.
Figure 9B:
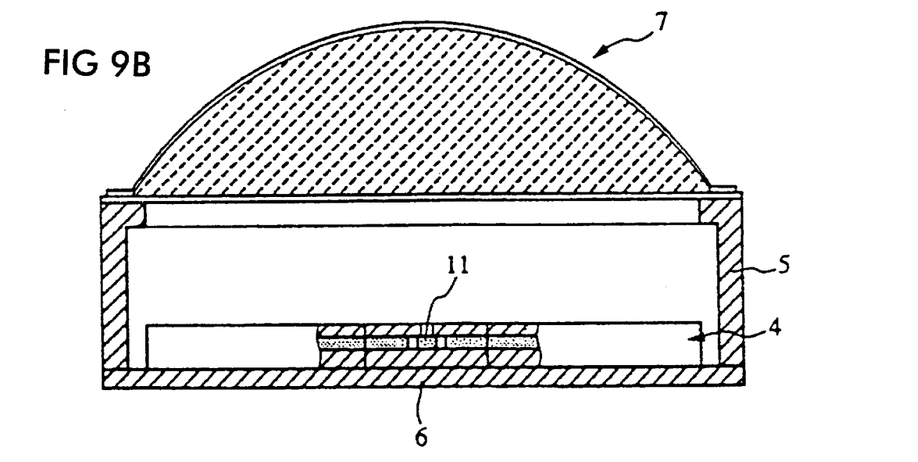
Figure 9C:
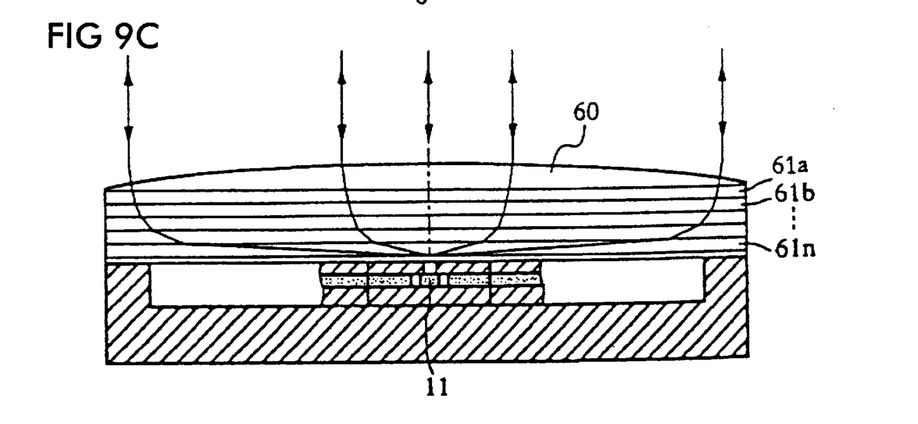

FIG. 9A is a sectional view of a transmission and receiving apparatus according to a fourth embodiment of the present invention. A part of the case 5 extends up to near the dielectric resonator 11. An opening portion H s formed above the dielectric resonator 11 in an extension portion of the case 5. The slope of the extension portion in which the opening portion H is formed forms a horn. In a fifth embodiment shown in FIG. 9B, the circuit unit 4 may be disposed within the case 5. In a sixth embodiment shown in FIG. 9C, a dielectric lens formed of a lamination of dielectric layers 61a to 61n having mutually different relative dielectric constant and a dielectric convex lens element 60 may be used. In this case, by decreasing the relative dielectric constant in such a way that the relative dielectric constant decreases gradually from the topmost dielectric layer 61a to the bottommost dielectric layer 61n, the dielectric lens can be made thin.

Figure 10A:
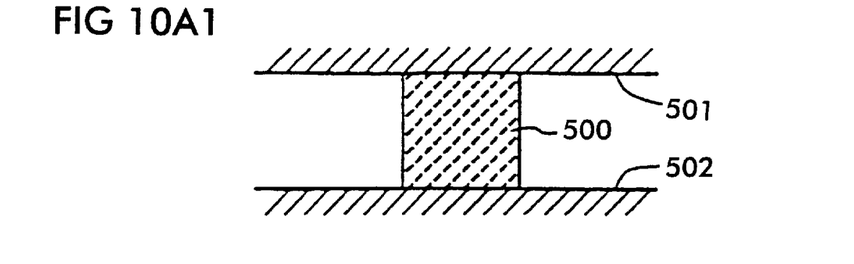
Figure 10A:
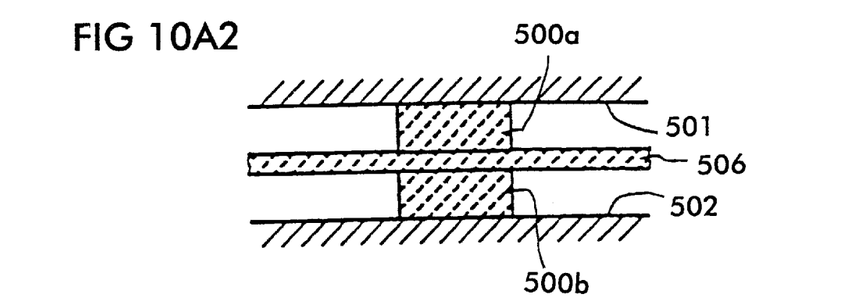

FIGS. 10A1 and 10A2 show another dielectric line for use in a transmission and receiving apparatus of the present invention. A normal-type dielectric line 500 in which grooves are not formed in the upper and lower conductor plates may be used in an antenna-shared distributor. A dielectric line with a circuit substrate 506 interposed in the middle thereof may be used in the voltage-controlled oscillator and the mixer.

Figure 10B:
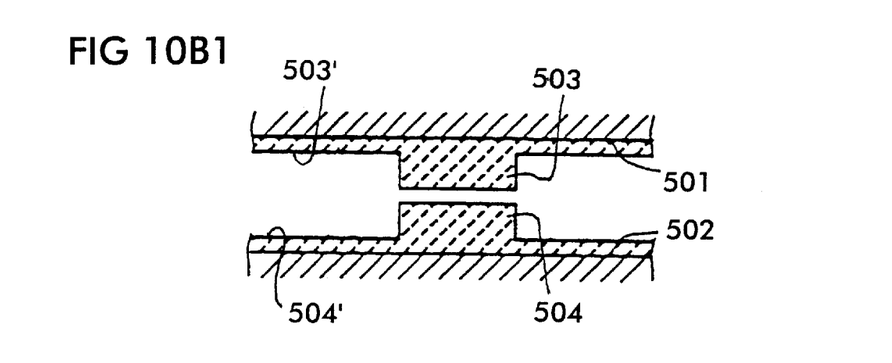
Figure 10B:
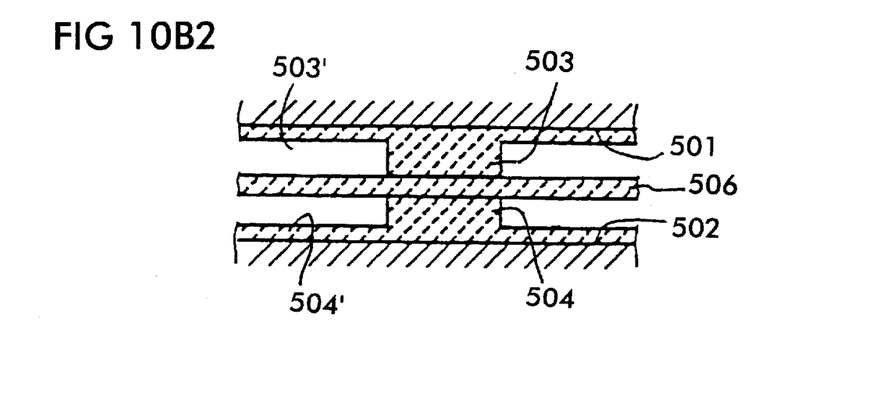

As shown in FIGS. 10B1 and 10B2, a wing-type dielectric line such that wings 503' and 504' extend to the right and left in the figures from dielectric lines 503 and 504 may be used. The wing-type dielectric lines 503 and 504 with the circuit substrate 506 interposed therebetween may also be used as shown in FIG. 10B2.

The compact and simple antenna-shared distributor and the transmission and receiving apparatus using such distributor according to the present invention makes it possible to save space when they are mounted in a vehicle. Further, the simple construction increases fault tolerance.

The present disclosure relates to subject matter contained in Japanese Patent Application No. HEI8-280681 filed on Oct. 23, 1996, which is expressly incorporated herein by reference in its entirety.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An antenna-shared distributor comprising:
   two facing conductor sections;
   a dielectric resonator disposed between said conductor sections;
   a non-conductor section which is provided in at least one of said conductor sections and which faces said dielectric resonator;
   a first dielectric line disposed adjacent said dielectric resonator; and
   a second dielectric line disposed adjacent said dielectric resonator.

2. The antenna-shared distributor of claim 1, wherein said non-conductor section is a hole which goes through the conductor section.

3. The antenna-shared distributor of claim 1, further wherein grooves are provided in at least one of said conductor sections which hold said dielectric line.

4. The antenna-shared distributor of claim 1, further comprising a dielectric wing section which extends along the surface of at least one of said facing conductor sections from at least one of said dielectric lines.

5. The antenna-shared distributor of claim 1, further comprising a dielectric rod which couples electromagnetically to said dielectric resonator.

6. The antenna-shared distributor of claim 5, wherein said dielectric rod goes through said non-conductor section.

7. The antenna-shared distributor of claim 1, wherein said non-conductor section comprises a slot provided in said non-conductor section.

8. A transmission and receiving apparatus comprising:
   an antenna-shared distributor including:
      two facing conductor sections;
      a dielectric resonator disposed between said conductor sections;
      a non-conductor section which is provided in at least one of said conductor sections and which faces said dielectric resonator;
      a first dielectric line disposed adjacent said dielectric resonator; and
      a second dielectric line disposed adjacent said dielectric resonator;
   an oscillator coupled to said first dielectric line; and
   a mixer coupled to said second dielectric line.

9. The transmission and receiving apparatus of claim 8, wherein said oscillator includes:
   a third dielectric line coupled to said dielectric resonator; and
   an oscillator circuit coupled to said third dielectric line.

10. The transmission and receiving apparatus of claim 9, wherein said oscillator circuit includes:
    a suspended line coupled to said third dielectric line;
    an RF choke connected to said suspended line; and
    electrodes connected to said RF choke.

11. The transmission and receiving apparatus of claim 8, wherein said mixer includes:
    a fourth dielectric line coupled to said dielectric resonator; and
    a mixer circuit coupled to said fourth dielectric line.

12. The transmission and receiving apparatus of claim 11, wherein said mixer circuit includes:
    a nonlinear element coupled to said fourth dielectric line;
    an RF choke connected to said nonlinear element; and
    electrodes connected to said RF choke.

13. The transmission and receiving apparatus of claim 8, further comprising a horn-shaped electromagnetic guide disposed around said non-conductor section.

14. The transmission and receiving apparatus of claim 9, wherein said oscillator circuit includes:
    a circulator having three terminals, inserted in the middle of said third dielectric line, two terminals of which are coupled to said third dielectric line; and
    a terminator connected to the remaining terminal of said circulator.

15. The transmission and receiving apparatus of claim 8, wherein said first dielectric line, said second dielectric line and said dielectric resonator are provided in line with each other.

16. The transmission and receiving apparatus of claim 8, wherein a line which connects an extension line of said dielectric resonator and said first dielectric line substantially intersects at right angles to a line which connects an extension line of said dielectric resonator and said second dielectric line.

17. The transmission and receiving apparatus of claim 8, further comprising a dielectric lens at a position facing said non-conductor section.

18. The transmission and receiving apparatus of claim 8, wherein said oscillator comprises a circulator having three terminals, a first terminal being coupled to an oscillator circuit, a second terminal being coupled to said first dielectric line and a third terminal being connected to a terminator circuit.

19. The transmission and receiving apparatus of claim 8, further comprising a signal processing apparatus coupled to the transmission and receiving apparatus, the signal processing apparatus comprising a signal processing section for processing a signal from the transmission and receiving apparatus and a warning section receiving an output from the transmission and receiving apparatus.

20. The transmission and receiving apparatus of claim 17, wherein the dielectric lens comprises a lamination of dielectric layers having mutually different relative dielectric constant and a dielectric outermost convex lens element.

21. The transmission and receiving apparatus of claim 20, wherein the relative dielectric constant of the dielectric layers decreases gradually from a topmost one of the layers to a bottommost one of the layers.

22. The transmission and receiving apparatus of claim 8, wherein the oscillator comprises a voltage controlled oscillator.

23. The transmission and receiving apparatus of claim 22, wherein the oscillator includes a dielectric line, the dielectric line comprising dielectric strips fitted into respective grooves of said facing conductor sections with a substrate disposed between the dielectric strips.

24. The transmission and receiving apparatus of claim 8, wherein the mixer includes a dielectric line, the dielectric line comprising dielectric strips fitted into respective grooves of said facing conductor sections with a substrate disposed between the dielectric strips.

* * * * *